(12) United States Patent
Magar et al.

(10) Patent No.: US 9,607,148 B1
(45) Date of Patent: Mar. 28, 2017

(54) METHOD AND APPARATUS FOR DETECTING MALWARE ON A COMPUTER SYSTEM

(75) Inventors: Sujit Magar, Pune (IN); Anand Bodke, Maharashtra (IN); Abhijit Limaye, Pune (IN); Prabhat Singh, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 457 days.

(21) Appl. No.: 12/495,741

(22) Filed: Jun. 30, 2009

(51) Int. Cl.
*G06F 21/56* (2013.01)
*H04L 29/06* (2006.01)

(52) U.S. Cl.
CPC ............ *G06F 21/56* (2013.01); *H04L 63/145* (2013.01)

(58) Field of Classification Search
CPC ... H04L 63/14; H04L 63/145; H04L 63/1416; H04L 63/1408; H04L 63/1441; H04L 63/1458; G06F 21/552
USPC .................. 726/1, 13, 22–33; 713/153–154, 713/187–188, 193–194; 709/206, 249, 709/389
See application file for complete search history.

(56) References Cited

U.S. PATENT DOCUMENTS

| | | | |
|---|---|---|---|
| 6,886,099 B1* | 4/2005 | Smithson | G06F 21/554 709/206 |
| 7,530,106 B1* | 5/2009 | Zaitsev et al. | 726/24 |
| 7,694,150 B1* | 4/2010 | Kirby | 713/188 |
| 2003/0200462 A1* | 10/2003 | Munson | 713/200 |
| 2007/0067843 A1* | 3/2007 | Williamson | G06F 21/568 726/24 |
| 2007/0150957 A1* | 6/2007 | Hartrell et al. | 726/24 |
| 2007/0240215 A1* | 10/2007 | Flores | G06F 21/55 726/24 |
| 2007/0240221 A1* | 10/2007 | Tuvell et al. | 726/24 |
| 2007/0240222 A1* | 10/2007 | Tuvell et al. | 726/24 |
| 2009/0077664 A1* | 3/2009 | Hsu et al. | 726/24 |
| 2010/0077481 A1* | 3/2010 | Polyakov et al. | 726/24 |
| 2010/0146589 A1* | 6/2010 | Safa | 726/3 |

* cited by examiner

*Primary Examiner* — Evans Desrosiers
(74) *Attorney, Agent, or Firm* — Wilmer Cutler Pickering Hale and Dorr LLP (57) ABSTRACT

Method, apparatus, and computer readable medium for detecting malware on a target computer system is described. A threat profile is obtained at the target computer, the threat profile having manifestation information for known malware, the manifestation information including effects of the known malware on computer systems infected by the known malware. Using the threat profile, at least a portion of the manifestation information is detected on the target computer. A confidence level for detection of potential malware is determined based on the at least a portion of the manifestation information detected. The potential malware on the target computer is convicted as malware for remediation if the confidence level satisfies a threshold confidence level.

17 Claims, 6 Drawing Sheets

METHOD AND APPARATUS FOR DETECTING MALWARE ON A COMPUTER SYSTEM

BACKGROUND

Field of the Invention

Embodiments of the present invention generally relate to computer systems, more particularly, to a method and apparatus for detecting malware on a computer system.

Description of the Related Art

Software designed to infiltrate a computer system without authorization is typically referred to as "malware". Such software includes computer viruses, worms, Trojan horses, spyware, adware, and the like known in the art. Software designed to detect and mitigate malware is generally referred to herein as "anti-virus (AV)" software. Current AV software can employ two techniques for detecting malware: (1) signature-based detection; and (2) behavior-based detection. Both techniques have their limitations. For example, signature-based techniques require a malware sample so that a "signature" of the malware can be created and used by computer systems for use in detecting the malware. Signature-based techniques are ineffective in dealing with advanced malware threats, such as polymorphic, obfuscated, packed malware threats, or like type threats for which it is difficult or impossible to create signatures. Further, it is inefficient or impossible to create signatures for the several millions of new malware released each year. Behavior-based techniques also require a malware sample, but can identify variants of known malware if the variants exhibit the same behavior. Authors of malware, however, have begun to introduce changes in behavior in the variants of malware in order to escape behavioral detection.

Accordingly, there exists a need in the art for a method and apparatus for detecting malware on a computer system that overcomes the disadvantages associated with pure signature-based and behavior-based malware detection techniques.

SUMMARY OF THE INVENTION

Embodiments of the invention relate to a method, apparatus, and computer readable medium for detecting malware on a target computer system. A threat profile is obtained at the target computer, the threat profile having manifestation information for known malware, the manifestation information including effects of the known malware on computer systems infected by the known malware. Using the threat profile, at least a portion of the manifestation information is detected on the target computer. A confidence level for detection of potential malware is determined based on the at least a portion of the manifestation information detected. The potential malware on the target computer is convicted as malware for remediation if the confidence level satisfies a threshold confidence level.

In some embodiments, a sample of the potential malware is sent from the target computer to a server over a network if the confidence level does not satisfy the threshold confidence level. In some embodiments, the manifestation information of the threat profile includes at least one modification to a file system on the target computer. In some embodiments, the manifestation information of the threat profile includes at least one modification to an operating system registry on the target computer. In some embodiments, the manifestation information of the threat profile includes at least one modification of drivers on the target computer. In some embodiments, the manifestation information of the threat profile includes at least one modification of software services executed by the target computer. In some embodiments, the threat profile is obtained by the target computer from a server over a network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail further below, various embodiments of the present disclosure enable computer systems to detect malware that may not be detected by signature-based and/or behavioral-based detection schemes. In some embodiments, a target computer obtains a threat profile having manifestation information for known malware. The manifestation information can include effects of the known malware on computer systems infected by the known malware. For example, when malware is executed on a computer system, the malware may cause one or more modifications on the computer system, such as changes to the file system, changes to the operating system, and the like. That is, the malware exhibits a certain behavior or activity, the results of which are manifested on the computer system. In some embodiments, the target computer uses the threat profile to detect at least a portion of the manifestation information on the target computer. The target computer can then determine a confidence level for detection of potential malware based on the particular manifestation information that has been detected. That is, potential malware is detected by looking for results or effects of the malware after execution thereof. The target computer can convict the potential malware as malware for remediation if the confidence level satisfies a threshold confidence level. Otherwise, the target computer can send a sample of the potential malware to a server over a network for further analysis.

Figure 1:
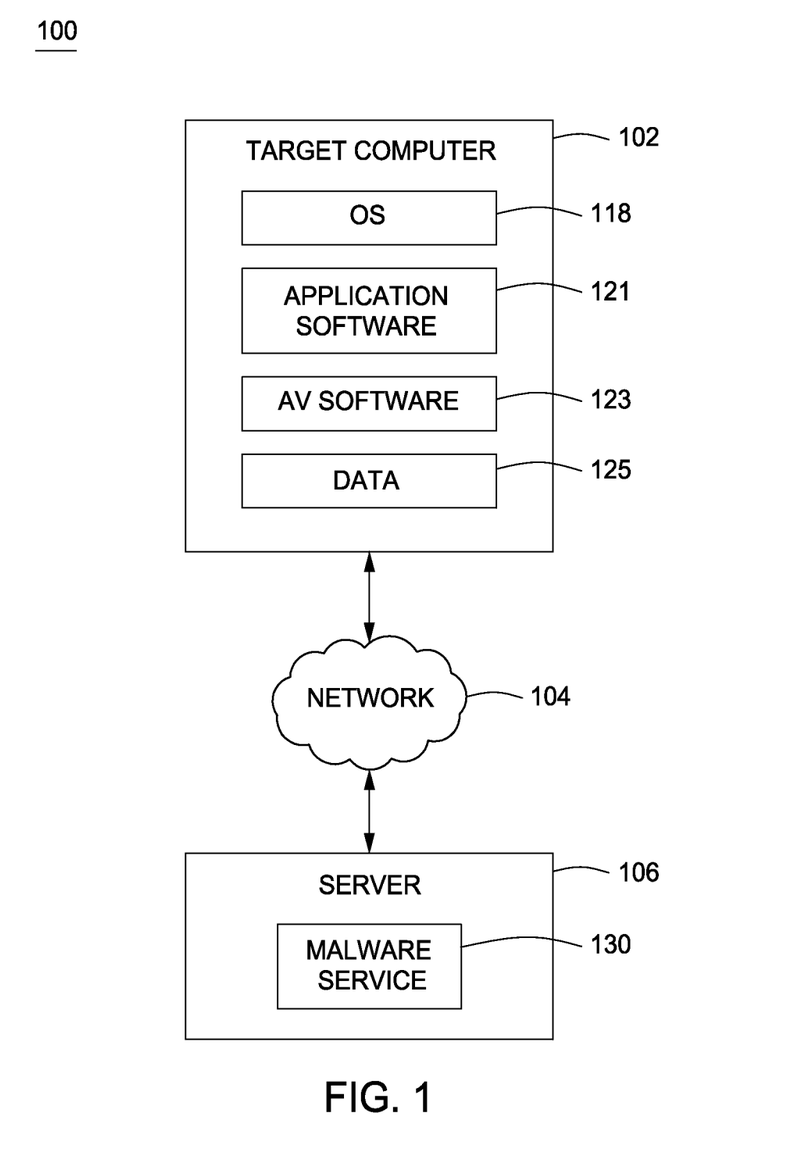
FIG. 1 is a block diagram of a system for detecting malware according to some embodiments of the invention.

FIG. 1 is a block diagram of a system 100 for detecting malware according to some embodiments of the invention. The system 100 may form a computing environment that comprises a target computer 102, a network 104, and a server 106. The network 104 comprises a communication system that connects computer systems by wire, cable, fiber optic, and/or wireless links facilitated by various types of well-known network elements, such as hubs, switches, routers, and the like. In particular, the network 104 may connect the target computer 102 and the server 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN). Alternatively, the network 104 may comprise a storage area network (SAN) implemented using fibre channel (FC) or the like.

Generally, the target computer 102 may be any type of computing device (e.g., a laptop, a desktop, a handheld computer, a terminal and/or the like) known in the art. The target computer 102 is configured with an operating system (OS) 118, application software 121, and antivirus (AV) software 123. The target computer 102 is also configured to store data 125, which may include various files stored in a file system. The OS 118 controls execution of software on the target computer 102, as is known in the art. The application software 121 may include any known software application capable of being executed by the OS 118 on the target computer 102. The AV software 123 is configured to detect and remediate malware on the target computer 102. The AV software 123 can interact with the server 106 to facilitate detection and remediation of malware on the target computer 102.

In some embodiments, the AV software 123 obtains one or more threat profiles from the server 106. Each threat profile includes manifestation information for known malware. The manifestation information can include effects of the known malware on computer systems infected by the known malware. The AV software 123 can use a threat profile to detect at least a portion of the manifestation information on the target computer 102. The AV software 123 can then determine a confidence level for detection of potential malware based on the particular manifestation information that has been detected. The AV software 123 can convict the potential malware as malware for remediation if the confidence level satisfies a threshold confidence level. In some embodiments, if the confidence level does not satisfy the threshold confidence level, the AV software 123 can send a sample of the potential malware to the server 106 over the network 104 for further analysis.

The server 106 may be any type of computing device known in the art. The server 106 is configured with a malware service 130. The malware service 130 is configured to communicate with the AV software 123 on the target computer 102 over the network 104. Notably, the malware service 130 can send threat profiles to the AV software 123, which can be used to detect malware on the target computer 102, as described above. The threat profiles can be created by collating information from various sources, such as a database of known malware, reports of malware manifestation published by vendors of AV software, information provided by AV researchers, information obtained from established AV security "blogs" on the World Wide Web (WWW), information from public forums on the WWW, independent security analysts, and the like. For purposes of clarity by example, a single target computer is shown. It is to be understood that the invention may be employed in systems where multiple target computers are configured for communication with the server 106 over the network 104, in which case the malware service 130 can communicate with AV software in multiple target computers.

Figure 2:
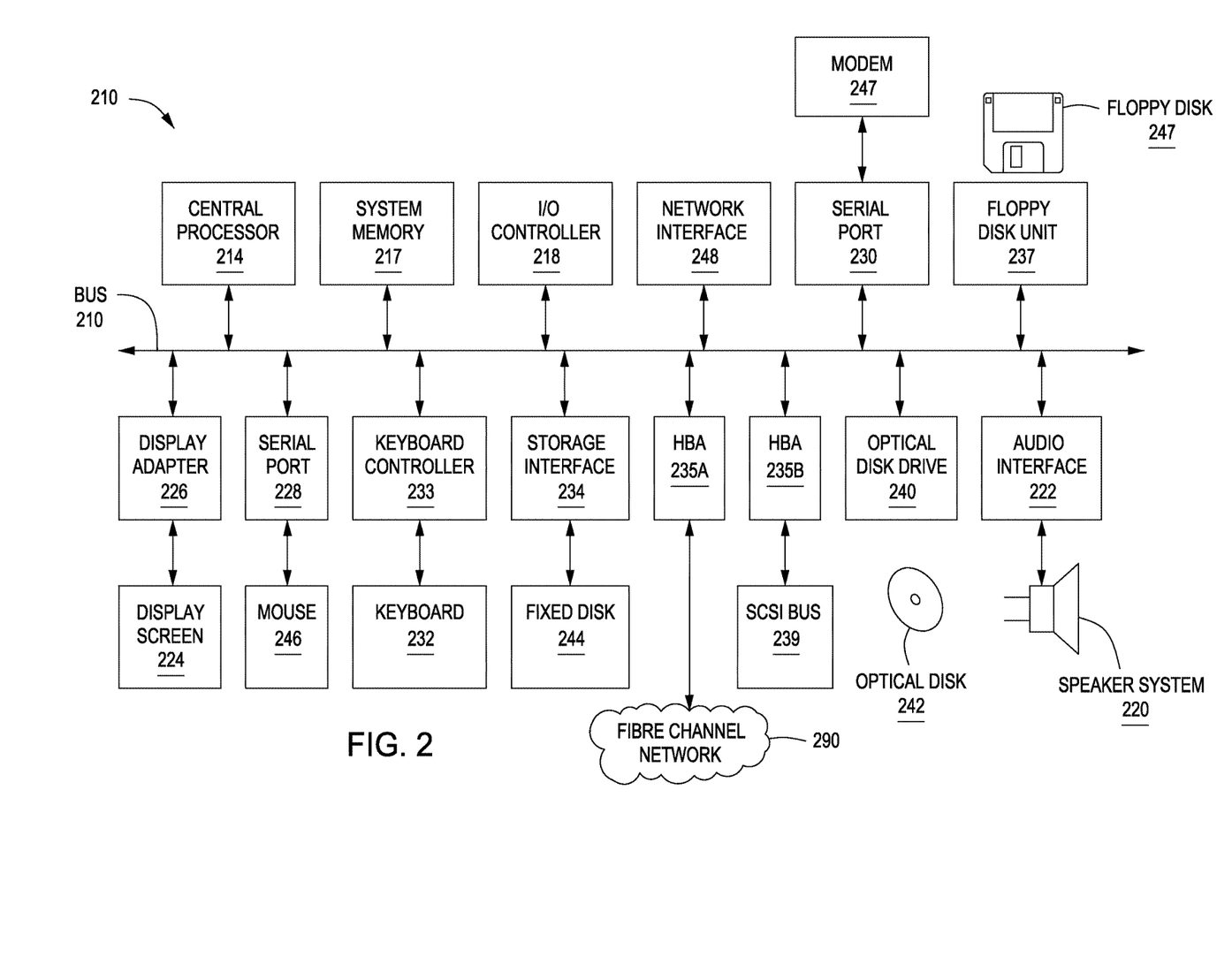
FIG. 2 is a block diagram of a suitable computer for implementing the present disclosure according to one or more embodiments.

FIG. 2 is a block diagram of a computer system 210 suitable for implementing embodiments of the invention. This system 210 is representative of a computer system that can be used to implement the target computer 102 and/or the server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212). In some embodiments, the computer system 210 may be an online gaming console.

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG.

2 is readily known in the art and is not discussed in detail in this application. Software code to implement embodiments of the invention can be stored in computer-readable storage media, such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
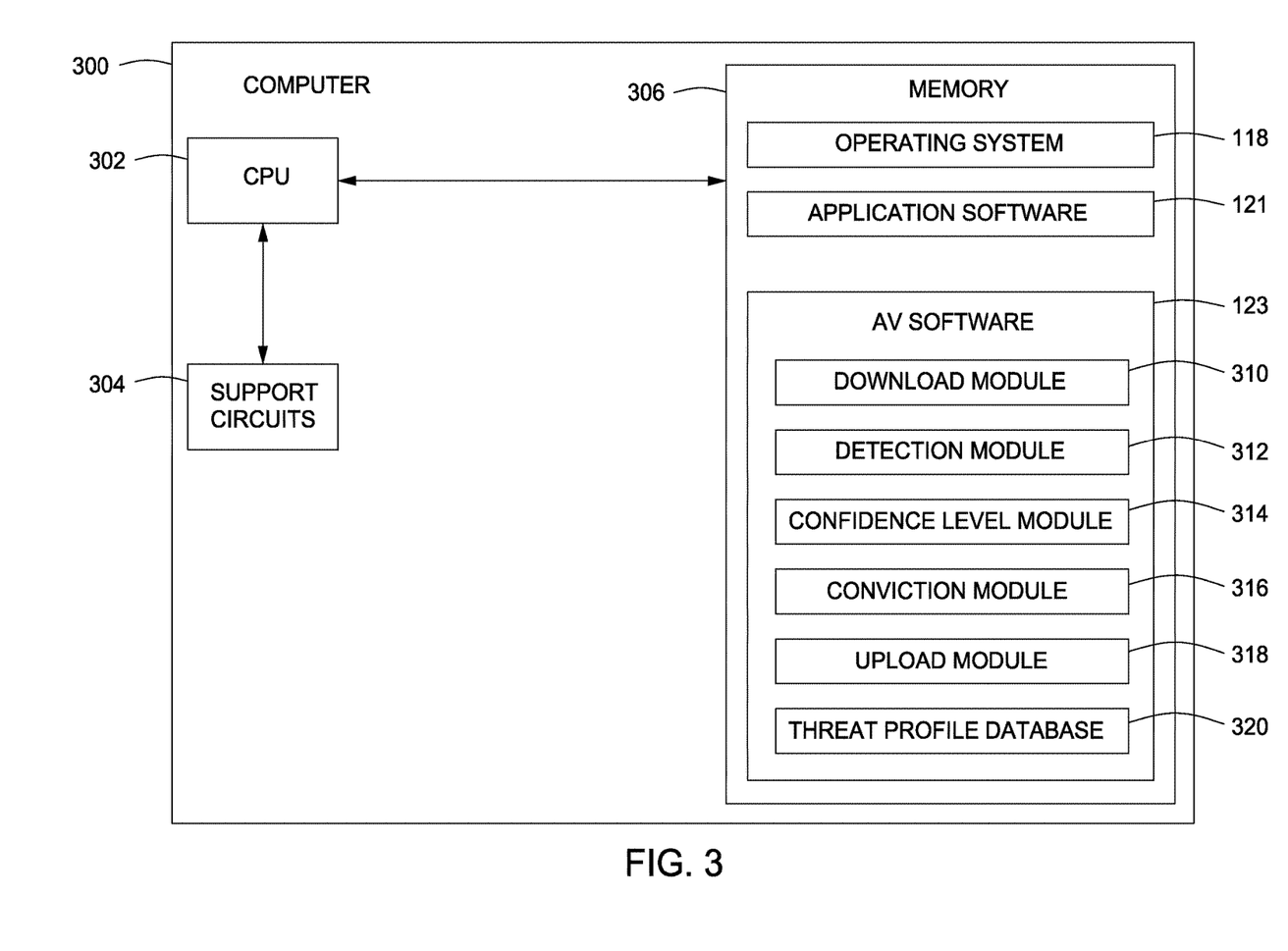
FIG. 3 is a block diagram of a computer configured to detect malware according to some embodiments of the invention.

FIG. 3 is a block diagram of a computer 300 configured to detect malware according to some embodiments of the invention. The computer 300 may be used to implement the target computer 102 shown in FIG. 1. The computer 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes various data and software packages, such as the OS 118, the application software 121, and the AV software 123.

The OS 118 generally manages various computer resources (e.g., network resources, data storage resources, file system resources and/or the like). The OS 118 is configured to execute operations on one or more hardware and/or software devices, such as Network Interface Cards (NICs), hard disks, virtualization layers, firewalls and/or the like. For example, the various software packages call commands associated with the OS 118 (i.e., native operating system commands) to perform various file system and/or storage operations, such as creating files or metadata, writing data to the files, reading data from the files, modifying metadata associated with the files and/or the like. The OS 118 may call one or more functions associated with device drivers to execute various file system and/or storage operations. As an example, the OS 118 may utilize a device driver associated with a NIC card to communicate data to another computer, as explained further below.

In some embodiments, the AV software 123 includes a download module 310, a detection module 312, a confidence level module 314, a conviction module 316, and an upload module 318. Each of the download module 310, the detection module 312, the confidence level module 314, the conviction module 316, and the upload module 318 may be implemented using software code (e.g., processor executable instructions) that is executed by the CPU 302 to perform the respective functions described below. The AV software 123 can maintain a threat profile database 320 having threat profiles for different malware families, as discussed below.

Figure 4:
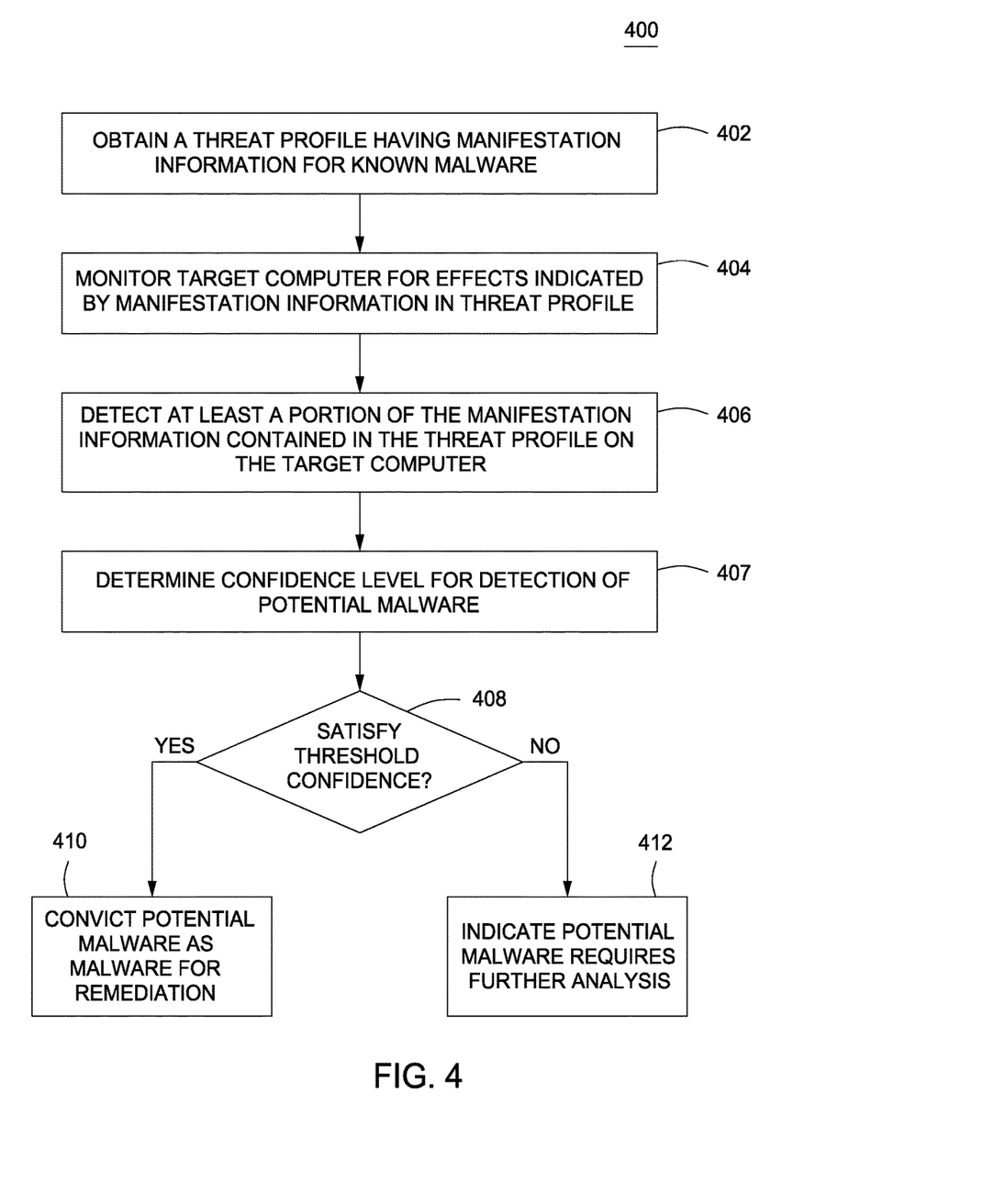
FIG. 4 is a flow diagram depicting a method of detecting malware on a target computer system according to some embodiments of the invention.

FIG. 4 is a flow diagram depicting a method 400 of detecting malware on a target computer system according to some embodiments of the invention. The method 400 may be implemented by the AV software 123, described above. Aspects of the method 400 may be understood with respect to the modules of the AV software 123 shown in FIG. 3. The method 400 begins at step 402, where the download module 310 obtains a threat profile. The download module 310 can obtain the threat profile from the server 106 (e.g., from the malware service 130). The download module 310 can store the threat profile in a memory, such as in the threat profile database 320 in the memory 306. The thread profile includes manifestation information for known malware. The manifestation information is indicative of effects the known malware has on computer systems infected by the known malware.

Notably, manifestation information is distinguishable from signature information for detecting malware based on a computed signature. The manifestation information is also distinguishable from behavior information for detecting malware based on behavior. Behavior information relates to activity or operation of the malware as it executes on the target computer. In contrast, the manifestation information refers to the effects or results of the malware execution. Detection of malware by observing effects of its execution can be advantageous as compared to signature and/or behavioral detection techniques, particularly for unknown malware (e.g., zero day malware). For example, consider a malware family having two known variants, referred to as malware A and malware B. A threat profile can be created that indicates the effects the malware family has on infected computer systems (threat profile creation is discussed below). Since the A and B variants of the malware are known, signatures and behavior profiles can be created and used for detection. However, assume a new variant C of the malware family is launched and hitherto not analyzed for signature and behavior (e.g., zero day malware). As noted above, the author of malware C may change the software code and behavior of variant C in order to escape detection by the signature and behavioral-based detection techniques. However, the effects of the malware variant C may not change substantially (e.g., one or more effects of the malware C may be the same as the malware A and B). Since the AV software 123 includes detection based on manifestation information, the AV software 123 can use the threat profile created for malware A and malware B to detect new malware C, despite malware C having a different behavior and signature.

The manifestation information can include one or more effects. In some embodiments, the manifestation information can include at least one modification to a file system on the target computer (e.g., the data 125). In some embodiments, the manifestation information can include at least one modification to an operating system registry on the target computer. As known in the art, a "registry" or like type database is used by the operating system to control various aspects of the software environment. In some embodiments, the manifestation information can include at least one modification to drivers on the target computer. As noted above, the OS 118 can include various "drivers" for communicating with hardware on the target computer. In some embodiments, the manifestation information can include at least one modification of software services executed by the target computer. As known in the art, the OS 118 can execute one or more software services to perform various functions. In general, the manifestation information can include any information related to effects of malware execution on the target computer.

At step 404, the detection module 312 monitors the target computer for effects indicated by the manifestation information in the threat profile. The detection module 312 can access threat profiles in the threat profile database 320. The detection module 312 can monitor the file system, registry, drivers, services, and the like for modifications detailed in one or more threat profiles. At step 406, the detection module 312 detects at least a portion of the manifestation information contained in a threat profile on the target computer. For example, a threat profile can include a plurality of effects, and the detection module 312 can detect one or more of such effects on the target computer. At this point, the detection module 312 has detected potential malware on the target computer. The detection module 312 provides an indication of the potential malware as output. The detection module 312 can identify the potential malware by examining the effect(s) on the target computer as indicated in the threat profile (e.g., modifications of the file system, a service, a driver, a registry, etc. can indicate which software process made such modification). The detection module 312 can store the indication of the potential malware and the corresponding detected effects in a memory (e.g., the memory 306).

At step 407, the confidence level module 314 determines a confidence level for the detection of the potential malware. The confidence level module 314 can access the indications of the potential malware and the corresponding detected effects in a memory (e.g., the memory 306). The confidence level module 314 can determine a confidence level selected from a scale of levels based on how many detected effects match the effects described in the threat profile. A higher confidence level can be given in cases where more detected effects match the effects described in the threat profile, and a lower confidence level can be given in cases where less detected effects match the effects described in the threat profile. The confidence level provides a measure of how certain the potential malware is actually malware. The confidence level module 314 can store the determined confidence level for the potential malware in a memory (e.g., the memory 306).

At step 408, the conviction module 316 determines whether the confidence level for the potential malware satisfies a threshold confidence level. The conviction module 316 can access the confidence level for the potential malware from a memory (e.g., the memory 306). If the confidence level satisfies the threshold confidence level, the method 400 proceeds to step 410. At step 410, the conviction module 316 convicts the potential malware as malware for remediation. Upon conviction, the AV software 123 may perform various remediation techniques to mitigate the malware from the target computer known in the art (e.g., quarantining, removing, and the like).

If the confidence level does not satisfy the threshold confidence level at step 408, the method 400 proceeds to step 412. At step 412, the conviction module 316 indicates that the potential malware requires further analysis. The conviction module 316 may store such an indication in a memory (e.g., the memory 306). At step 414, the upload module 318 sends a sample of the potential malware from the target computer to a server over a network (e.g., to the server 106 over the network 104). The upload module 318 can send the sample of the potential malware in response to an indication in a memory (e.g., the memory 306) that the potential malware requires further analysis (as determined by the conviction module 316). The upload module 318 can obtain the sample of the potential malware based on its identification as determined and stored in a memory by the detection module 312. Sending a sample of the potential malware to the server allows the server to perform further analysis in order to determine if the potential malware is actually malware. If the potential malware is actually malware, the server can then perform signature and/or behavioral analysis in order to facilitate signature and/or behavioral detection of such malware on computers.

Figure 5:
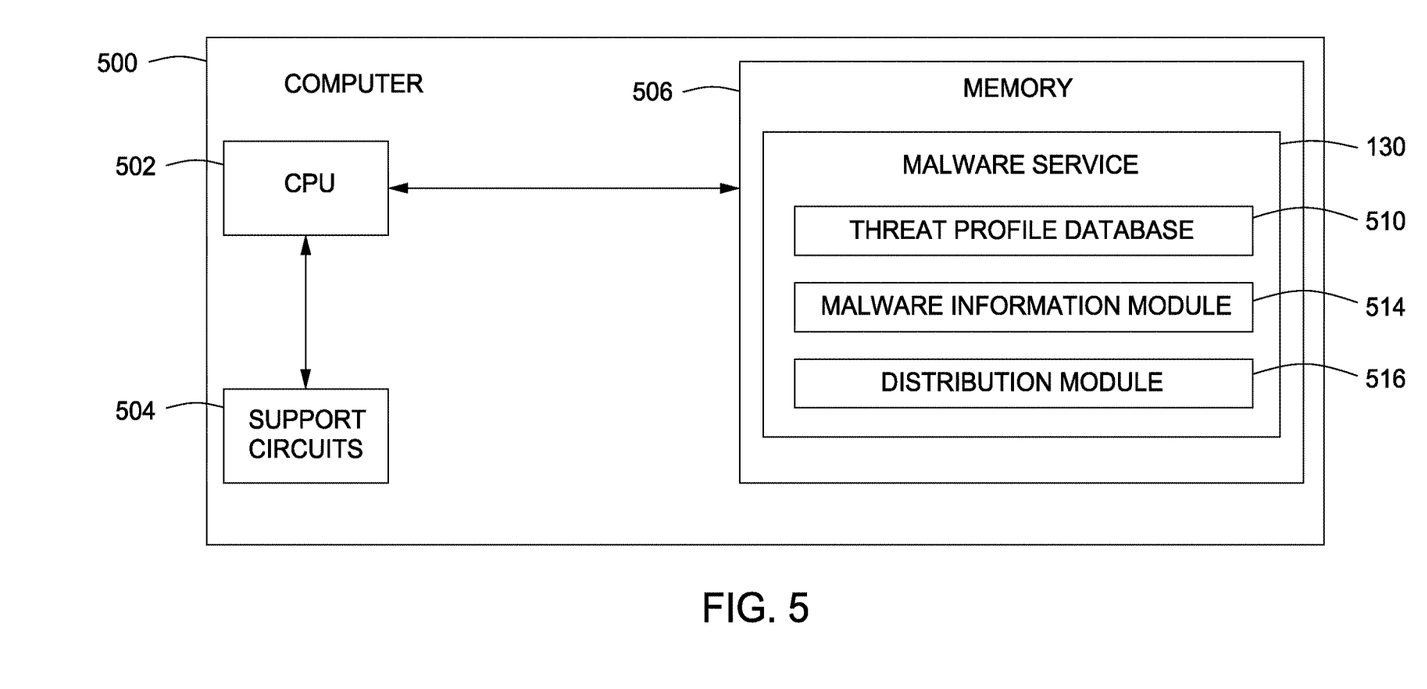
FIG. 5 is a block diagram of a computer configured to analyze malware and produce threat profiles according to some embodiments of the invention.

FIG. 5 is a block diagram of a computer 500 configured to analyze malware and produce threat profiles according to some embodiments of the invention. The computer 500 may be used to implement the server 106 shown in FIG. 1. The computer 500 is a type of computing device (e.g., a laptop, a desktop and/or the like) that comprises a Central Processing Unit (CPU) 502, various support circuits 504 and a memory 506. The CPU 502 may comprise one or more commercially available microprocessors or microcontrollers that facilitate data processing and storage. Various support circuits 504 facilitate operation of the CPU 502 and may include clock circuits, buses, power supplies, input/output circuits and/or the like. The memory 506 includes a read only memory, random access memory, disk drive storage, optical storage, removable storage, and the like. The memory 506 includes various data and software packages, such as the malware service 130.

In some embodiments, the malware service 130 includes a malware information module 514, a distribution module 516, and a threat profile module 510. Each of the malware information module 514, the distribution module 516, and the threat profile module 510 may be implemented using software code (e.g., processor executable instructions) that is executed by the CPU 502 to perform the respective functions described below.

Figure 6:
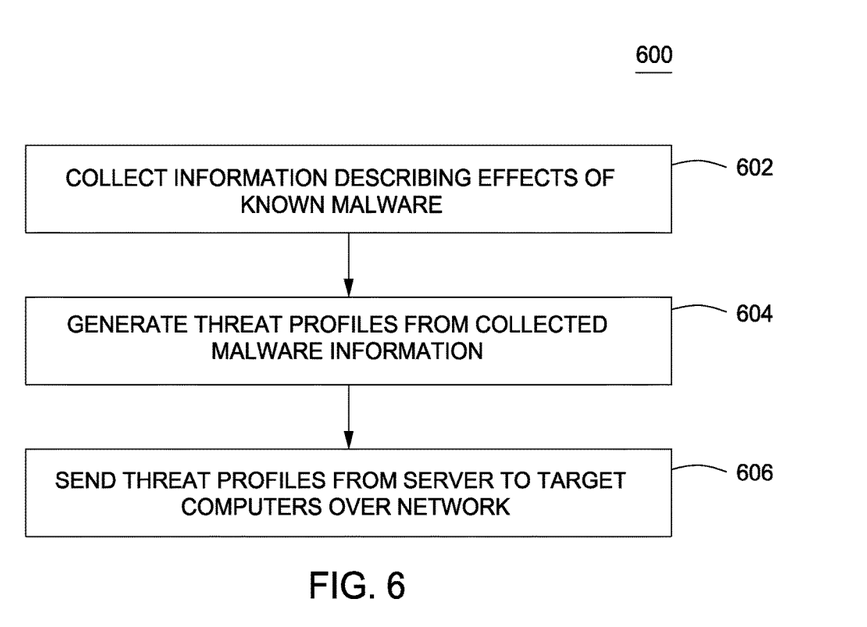
FIG. 6 is a flow diagram depicting a method of generating threat profiles according to some embodiments of the invention.

FIG. 6 is a flow diagram depicting a method 600 of generating threat profiles according to some embodiments of the invention. The method 600 may be implemented by the malware service 130, described above. Aspects of the method 600 may be understood with respect to the modules of the malware service 130 shown in FIG. 5. The method 600 begins at step 602, where the malware information module 514 collects information describing effects of known malware. The malware information module 514 can obtain the information from various sources, such as from information in a memory (e.g., the memory 506) or information obtained over the network 104. Exemplary sources of malware information include: a database of known malware and effects of such malware on computer systems; reports published by AV vendors and the like on the WWW; information provided by AV researchers; information from security "blogs" on the WWW; information provided by public forums on the WWW; information from independent security analysts; and the like. The malware information module 514 can store the collected information in a memory (e.g., the memory 506).

At step 604, the threat profile module 510 generates threat profiles from the collected malware effect information. The threat profile module 510 can obtain the malware effect information from a memory (e.g., the memory 506). For a given known malware (or family of related malware), the threat profile module 510 can generate a threat profile having a list of known effects the malware has on computer systems. The threat profile module 510 can store threat profiles in a memory (e.g., the memory 506).

At step 606, the distribution module 516 sends threat profiles from the server 106 to target computers (e.g., the target computer 102) over the network 104. The distribution module 516 can obtain the threat profiles from a memory (e.g., the memory 506).

Method, apparatus, and computer readable medium for detecting malware on a target computer system has been described. In some embodiments, a target computer obtains a threat profile having manifestation information for known malware. The manifestation information can include effects of the known malware on computer systems infected by the known malware. The target computer uses the threat profile to detect at least a portion of the manifestation information on the target computer. The target computer can then determine a confidence level for detection of potential malware based on the particular manifestation information that has been detected. That is, potential malware is detected by looking for results or effects of the malware after execution thereof. The target computer can convict the potential malware as malware for remediation if the confidence level satisfies a threshold confidence level. Otherwise, the target computer can send a sample of the potential malware to a server over a network for further analysis. Such malware detection exhibits the following advantages: (1) such detection does not require samples of malware to create a threat profile, but rather information about malware effects; (2) such detection is effective in detecting multiple variants of the same malware family; (3) such detection is immune to signature and/or behavior polymorphism, obfuscation, and packing; and (4) such detection relies on threat profiles that are generic in nature so as to not bloat AV definitions.

In some embodiments, the detection technique described herein can be used to complement signature and/or behavior-based detection techniques. That is, the AV software 123 can also employ signature and/or behavior-based detection techniques.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer-implemented method of detecting malware on a target computer system, comprising:
    obtaining a threat profile at the target computer, the threat profile having manifestation information for known malware, the manifestation information including post-execution effects of the known malware on computer systems infected by the known malware but not including pre-execution signatures of the known malware or execution behavior of the known malware, wherein the threat profile is generated on an external server by a malware information module that collects the manifestation information from a plurality of sources including the World Wide Web and a database of known effects of malware on computer systems, wherein the threat profile is sent from the external server to the target computer for malware prevention, and wherein the manifestation information collected from the World Wide Web comprises publicly available information related to security;
    detecting, using the threat profile, at least a portion of the manifestation information on the target computer, the detecting including allowing potential malware to run on the target computer and examining post-execution effects of the potential malware after the potential malware has run on the target computer, wherein the detected manifestation information includes at least an indication that the post-execution effects were caused by a software process of the potential malware;
    comparing the post-execution effects of the known malware on the infected computer systems with the post-execution effects of the potential malware on the target computer;
    determining a confidence level for detection of potential malware based on the comparison of the post-execution effects of the known malware on the infected computer systems with the post-execution effects of the potential malware on the target computer, wherein the confidence level is further based on a number of detected post-execution effects matching the effects identified in the threat profile;
    convicting the potential malware on the target computer as malware for remediation if the confidence level satisfies a threshold confidence level; and
    sending a sample of the potential malware from the target computer to a server over a network for further analysis if the confidence level does not satisfy the threshold confidence level.

2. The method of claim 1, wherein the manifestation information of the threat profile includes at least one modification to a file system on the target computer.

3. The method of claim 1, wherein the manifestation information of the threat profile includes at least one modification to an operating system registry on the target computer.

4. The method of claim 1, wherein the manifestation information of the threat profile includes at least one modification of drivers on the target computer.

5. The method of claim 1, wherein the manifestation information of the threat profile includes at least one modification of software services executed by the target computer.

6. The method of claim 1, wherein the threat profile is obtained by the target computer from a second server over a network.

7. An apparatus for detecting malware on a target computer system, the apparatus comprising:
    at least one computer processor configured to:
        obtain a threat profile at the target computer, the threat profile having manifestation information for known malware, the manifestation information including post-execution effects of the known malware on computer systems infected by the known malware but not including pre-execution signatures of the known malware or execution behavior of the known malware, wherein the threat profile is generated on an external server by a malware information module that collects the manifestation information from a plurality of sources including the World Wide Web and a database of known effects of malware on computer systems, wherein the threat profile is sent from the external server to the target computer for malware prevention, and wherein the manifestation information collected from the World Wide Web comprises publicly available information related to security;

detect, using the threat profile, at least a portion of the manifestation information on the target computer, by allowing potential malware to run on the target computer and examining post-execution effects of the potential malware after the potential malware has run on the target computer, wherein the detected manifestation information includes at least an indication that the post-execution effects were caused by a software process of the potential malware;

compare the post-execution effects of the known malware on the infected computer systems with the post-execution effects of the potential malware on the target computer;

determine a confidence level for detection of potential malware based on the comparison of the post-execution effects of the known malware on the infected computer systems with the post-execution effects of the potential malware on the target computer, wherein the confidence level is further based on a number of detected post-execution effects matching the effects identified in the threat profile;

convict the potential malware on the target computer as malware for remediation if the confidence level satisfies a threshold confidence level; and send a sample of the potential malware from the target computer to a server over a network for further analysis if the confidence level does not satisfy the threshold confidence level; and at least one memory, coupled to the at least one computer processor, configured to provide the at least one processor with instructions.

8. The apparatus of claim 7, wherein the manifestation information of the threat profile includes at least one modification to a file system on the target computer.

9. The apparatus of claim 7, wherein the manifestation information of the threat profile includes at least one modification to an operating system registry on the target computer.

10. The apparatus of claim 7, wherein the manifestation information of the threat profile includes at least one modification of drivers on the target computer.

11. The apparatus of claim 7, wherein the manifestation information of the threat profile includes at least one modification of software services executed by the target computer.

12. The apparatus of claim 7, wherein the threat profile is obtained by the target computer from a second server over a network.

13. At least one non-transitory processor readable storage medium storing a computer program of instructions, wherein the instructions cause at least one processor to perform a method of detecting malware on a target computer system, comprising:

obtaining a threat profile at the target computer, the threat profile having manifestation information for known malware, the manifestation information including post-execution effects of the known malware on computer systems infected by the known malware but not including pre-execution signatures of the known malware or execution behavior of the known malware, wherein the threat profile is generated on an external server by a malware information module that collects the manifestation information from a plurality of sources including the World Wide Web and a database of known effects of malware on computer systems, wherein the threat profile is sent from the external server to the target computer for malware prevention, and wherein the manifestation information collected from the World Wide Web comprises publicly available information related to security;

detecting, using the threat profile, at least a portion of the manifestation information on the target computer, the detecting including allowing potential malware to run on the target computer and examining post-execution effects of the potential malware after the potential malware has run on the target computer, wherein the detected manifestation information includes at least an indication that the post-execution effects were caused by a software process of the potential malware;

comparing the post-execution effects of the known malware on the infected computer systems with the post-execution effects of the potential malware on the target computer;

determining a confidence level for detection of potential malware based on the comparison of the post-execution effects of the known malware on the infected computer systems with the post-execution effects of the potential malware on the target computer, wherein the confidence level is further based on a number of detected post-execution effects matching the effects identified in the threat profile;

convicting the potential malware on the target computer as malware for remediation if the confidence level satisfies a threshold confidence level; and sending a sample of the potential malware from the target computer to a server over a network for further analysis if the confidence level does not satisfy the threshold confidence level.

14. The at least one non-transitory processor readable storage medium of claim 13, wherein the manifestation information of the threat profile includes at least one modification to a file system on the target computer.

15. The at least one non-transitory processor readable storage medium of claim 13, wherein the manifestation information of the threat profile includes at least one modification to an operating system registry on the target computer.

16. The at least one non-transitory processor readable storage medium of claim 13, wherein the manifestation information of the threat profile includes at least one modification of drivers on the target computer.

17. The at least one non-transitory processor readable storage medium of claim 13, wherein the manifestation information of the threat profile includes at least one modification of software services executed by the target computer.

* * * * *